(12) United States Patent
Jirman et al.

(10) Patent No.: US 7,774,790 B1
(45) Date of Patent: Aug. 10, 2010

(54) EVENT LOGGING AND PERFORMANCE ANALYSIS SYSTEM FOR APPLICATIONS

(75) Inventors: Stan Jirman, Santa Clara, CA (US); Charles Lloyd, Sunnyale, CA (US); Patrice Gautier, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 848 days.

(21) Appl. No.: 09/618,367

(22) Filed: Jul. 18, 2000

(51) Int. Cl.
  *G06F 3/00* (2006.01)
  *G06F 9/44* (2006.01)
  *G06F 9/46* (2006.01)
  *G06F 13/00* (2006.01)

(52) U.S. Cl. ................................................. 719/318
(58) Field of Classification Search ................ 709/318, 709/310, 200–245; 719/310–320, 328–330; 714/38; 717/127, 131, 124
  See application file for complete search history.

(56) References Cited

U.S. PATENT DOCUMENTS

| | | | | |
|---|---|---|---|---|
| 5,423,000 A * | 6/1995 | Kimura et al. | ................. | 713/1 |
| 5,446,878 A * | 8/1995 | Royal | ............................ | 714/1 |
| 5,740,354 A * | 4/1998 | Ben-Natan et al. | ............ | 714/45 |
| 5,819,094 A * | 10/1998 | Sato et al. | ................... | 717/131 |
| 5,872,909 A * | 2/1999 | Wilner et al. | ................ | 714/38 |
| 5,872,976 A * | 2/1999 | Yee et al. | .................... | 717/127 |
| 5,893,077 A * | 4/1999 | Griffin | ......................... | 705/34 |
| 6,144,967 A * | 11/2000 | Nock | ..................... | 707/103 R |
| 6,363,435 B1 * | 3/2002 | Fernando et al. | ............ | 719/318 |
| 6,470,388 B1 * | 10/2002 | Niemi et al. | ................ | 709/224 |
| 6,611,498 B1 * | 8/2003 | Baker et al. | ................. | 370/252 |
| 6,742,143 B2 * | 5/2004 | Kaler et al. | .................. | 714/39 |
| 6,836,894 B1 * | 12/2004 | Hellerstein et al. | .......... | 719/318 |
| 6,971,110 B1 * | 11/2005 | Marks et al. | ................ | 719/318 |
| 7,155,409 B1 * | 12/2006 | Stroh | ......................... | 705/37 |
| 7,243,271 B2 * | 7/2007 | Teegan et al. | ................. | 714/47 |
| 2002/0083217 A1 * | 6/2002 | Ward et al. | .................. | 709/328 |
| 2002/0138663 A1 * | 9/2002 | Ladwig | ...................... | 709/318 |
| 2004/0054770 A1 * | 3/2004 | Touboul | ..................... | 709/223 |
| 2006/0085798 A1 * | 4/2006 | Bendiksen et al. | .......... | 719/318 |

OTHER PUBLICATIONS

B. Bruege, et al, "A Framework for Dynamic Program Analyzers", OOPSLA'93, pp. 65-82.*
Lee Henry, S., Living With Syslog, SunExpert Magazine, Jan. 1998, pp. 34-37.
CERT Advisory, Syslog Vulnerability-A Workaround for Sendmail, CERT Advisory CA—95:13, October 19, 1995.
CERT Advisory, Syslog Vulnerability-A Workaround for Sendmail, CERT Advisory CA—1995-13, Oct. 19, 1995, Revised Sep. 23, 1997.
Rogers, R., Review of ICS Syslog Proxy, Dec. 10, 1999.

* cited by examiner

*Primary Examiner*—Diem K Cao
(74) *Attorney, Agent, or Firm*—Adeli & Tollen LLP (57) ABSTRACT

An event logging and analysis mechanism which creates an event object for event of an application to be logged. The event logging mechanism logs into the event object the start time, end time and other information regarding the event. The analysis of the collected event objects may include hierarchical and contextual grouping as well as aggregation of events considered to be identical. The mechanism operates independent of the application whose events it logs and can be turned on and off independently. A user may define the levels of hierarchy and contexts upon which to analyze the event objects.

44 Claims, 6 Drawing Sheets

EVENT LOGGING AND PERFORMANCE ANALYSIS SYSTEM FOR APPLICATIONS

BACKGROUND OF THE INVENTION

1. Field of the Invention

The present invention relates to software applications. More specifically, the present invention relates to the performance analysis and logging of events generated in applications.

2. Description of Related Art

One operation in fine-tuning and troubleshooting of information systems, such as a computer application, is to measure the "performance" (time taken) to deliver a requested result from that system. Performance tools have been developed which measure certain events from an operating system perspective by measuring the time taken to process operations such as computations and I/O (Input/Output). Performance can also be measured within an application itself. For instance, a videoconferencing application may have a mechanism for collecting and presenting metrics regarding the number of frames per second displayed on the screen or the number of frames skipped (not displayed). Such performance analysis mechanisms are typically built into the executable code of the application. Thus, typically, applications that do not have performance measurement code already built-in, must either completely forgo much measurement or rely on a third-party measurement tool. Due to the peculiarities between the way in which different software applications execute, generic measurement tools lack usefulness. If not specifically prepared for the application much of the information is geared toward sampling at given intervals what the application is doing. This does not necessarily give information that the user may be looking for or is interested in. Typically, the user must wade through piles of useless or uninteresting data regarding performance and may thus be unable to pick out those metrics of greatest importance.

All performance tools must preferably be operating as close, in a system or network sense, to the measured entity to eliminate the added measurement noise of latency which may skew results. The latency in delivering data over a network between clients and server completely renders useless the measurement of the operations themselves. In a client-server environment, there is often no separable measurement of client from server and server from client in regard to operations. For instance, in database applications where a server is being accessed and queried or updated by a client, timing of server operations needs to be isolated from the latency of network transfer. Likewise, timing of client operations may also need to be isolated from the very same latency.

What is often measured is only the time to gather the data from the server, and often, this is performed on the server side. Often, when preferred on the client side, this puts additional processing load on the client which can in turn degrade the accuracy of the measurement. When such measurements deal only with data collection time (request and response) rather than also the display of results, they are burdensome to the client and from the standpoint of the user, irrelevant.

There is a need for a performance measurement tool that can work interoperably with third-party applications, which is application and platform independent, and can be quickly and easily initiated when necessary and shut down when not.

There is also a need for a performance analysis system that allows measurement of selective operations of an application.

SUMMARY OF THE INVENTION

An event logging and analysis mechanism is provided which creates an event object for event of an application to be logged. The event logging mechanism logs into the event object the start time, end time and other information regarding the event. The analysis of the collected event objects may include hierarchical and contextual grouping as well as aggregation of events considered to be identical. The mechanism operates independent of the application whose events it logs and can be turned on and off independently. Further, in some embodiments, a user may define the levels of hierarchy and contexts upon which to analyze the event objects.

DETAILED DESCRIPTION

Figure 1:
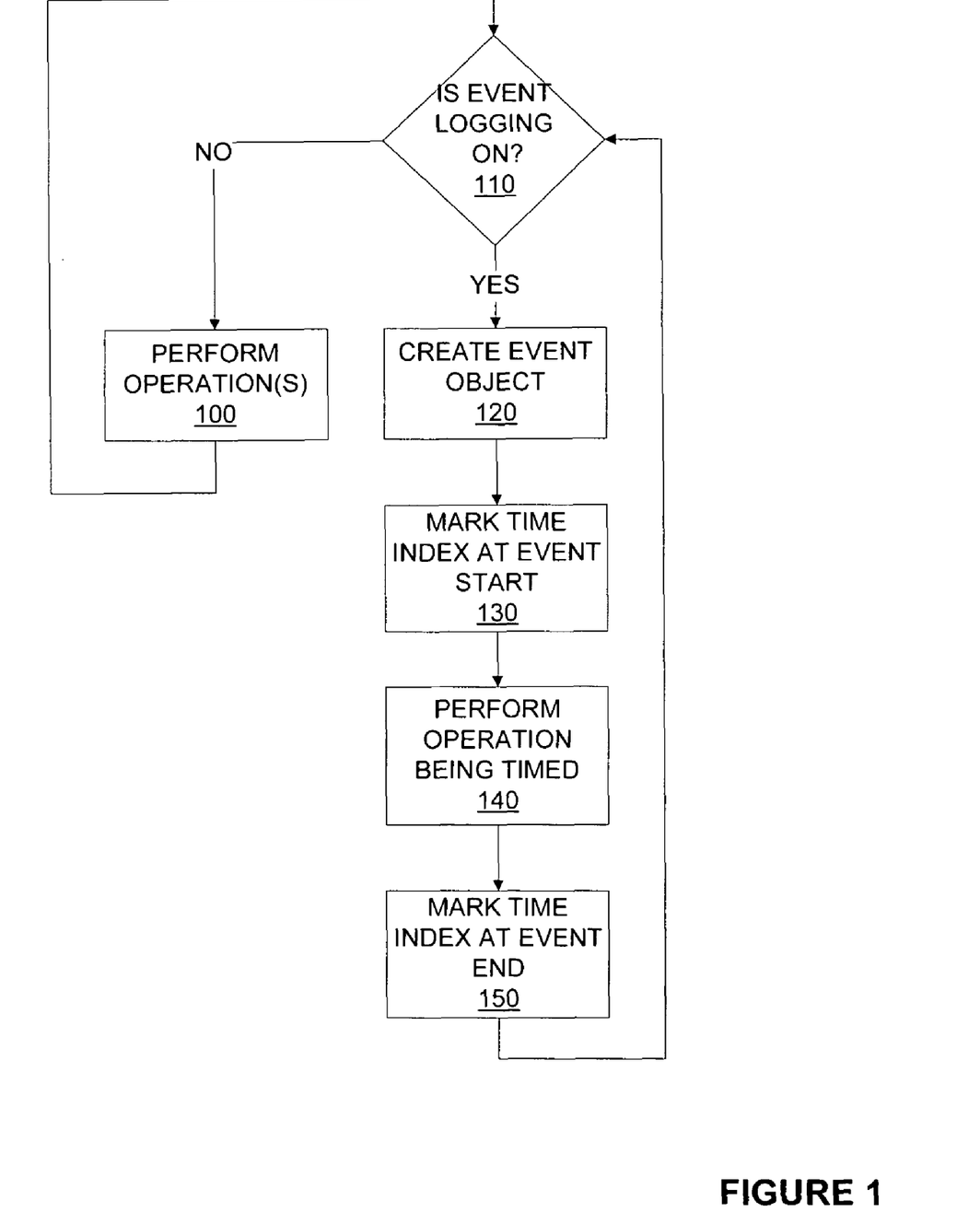
FIG. 1 is a flowchart describing basic event logging as utilized in one or more embodiments of the invention.

FIG. 1 is a flowchart describing basic event logging as utilized in one or more embodiments of the invention.

In accordance with the invention, event logging is characterized by its ability to be turned on or off at any instant in time during an applications' run-time. One advantage of the invention is that event logging requires no special linking to libraries or recompiling and need not be present as a feature in the design and compilation of the application whose events are to be logged. The performance of the application being measured is not impaired nor does its behavior change because the event logging is transparent from the application's viewpoint. One feature of the event logging mechanism is the ability to define the granularity at which "events" of an application are measured and displayed. The event logging mechanism of the invention also performs aggregation and grouping of event statistics such that a hierarchical view as well as contextual information is presentable to the user.

The event logging mechanism (referred to as the "event logging center") is built within a foundational layer that is common to a class of applications. Such a common foundational layer is sometimes referred to as a "framework." The framework is a common platform upon which applications may be built such that they take advantage of linkable libraries of code and standard routines that can be utilized during a run-time or at application development. Examples of a framework are the Java virtual machine and WebObjects (a product of Apple Computer Corporation). In addition to developmental frameworks, foundational layers may also be as low as the operating system itself. In this way, any application capable of running within that operating system can make use of operating system calls that perform event logging. Thus, the following description will refer variously to "operating system/framework" to indicate the lowest level of abstraction, common to all applications, that embeds the event logging center and its functionality. Further, the words "operation" and "event" will be used interchangeably to mean a piece of code that executes to perform some function during the flow of an application's run-time.

To achieve event logging, for each event or family of events identified, first the operating system/framework must check to see if event logging is turned on (block 110) in relation to an operation to be performed. To avoid any penalty to the execution of the operation that may be subjected to measure, the test of whether event logging is on or off for the operation should be a Boolean test. One mechanism for implementing such a Boolean test is by setting/resetting a flag whose state can be checked. There are flags created for each and every event or family ("group") of events that the application or operating system/framework identifies during run-time. If event logging is not on, then the operation is performed without any logging or measuring (block 100).

If event logging is turned on, then an "event object" is created (block 120). The event object is a software object or memory space designated for the log information be stored and later, accessed for analysis. According to one embodiment of invention, the event object subsists in a memory space called an "event center" wholly independent of any other applications, including the application whose operations are being logged. The event object is created by the framework. The event object marks the time index (obtainable, for instance, by returning the system clock's time information) at the start of the event (operation) being logged (block 130). The marking of the time index may be as simple as a read of the system clock and subsequent store in the event object. The operation being timed is then performed as it normally would were event logging not present (block 140). The operation itself returns no information other than whatever software mechanism is used to indicate its end (e.g. return of a function's result). When the operation is completed, the time index at the event's end is marked in identical manner with that of event start demarcation (block 150). In addition to start and end times, event objects may encapsulate information regarding what the operation actually did from a functional standpoint.

While the application is running and while event logging is still on, no specific analysis of the data present in the event object is performed. The process of marking start and end time indices according to FIG. 1 can be repeated for any objects at any level or context as are desired. Each operation (event) whether at a high grouping level (such as the entirety of a sub-routine) or at a lower level (such as a specific computation of a function as one of many within a sub-routine) can be assigned its own event object which marks its start and end time index. A new event object is instantiated for every occurrence of an operation, if the operation is repeated. Further, a user can select points of interest prior to invoking event logging to measure only certain specific events as opposed to a brute force logging and measurement of all events. This can serve to reduce the amount of memory/storage space utilized by the logging process and allows results displayed to the user at a later stage to be filtered of non-pertinent or non-critical event statistics. Further, as demonstrated below, event object based logging aids in developing a hierarchy of event statistics, grouping of events and contextual differentiation. The structural and procedural nature of most code can be exposed in this manner and statistics can be used to monitor the execution efficiency program flow, rather than just measures of input/output timing.

The following description refers to "events" but should be understood to mean "event objects" which result from the logging of actual events that have occurred in an application. Once event logging is turned off, only "event objects" remain to represent the actual events which occurred with the application, and thus, "event objects" and "events" are viewed as one in the same.

Figure 2:
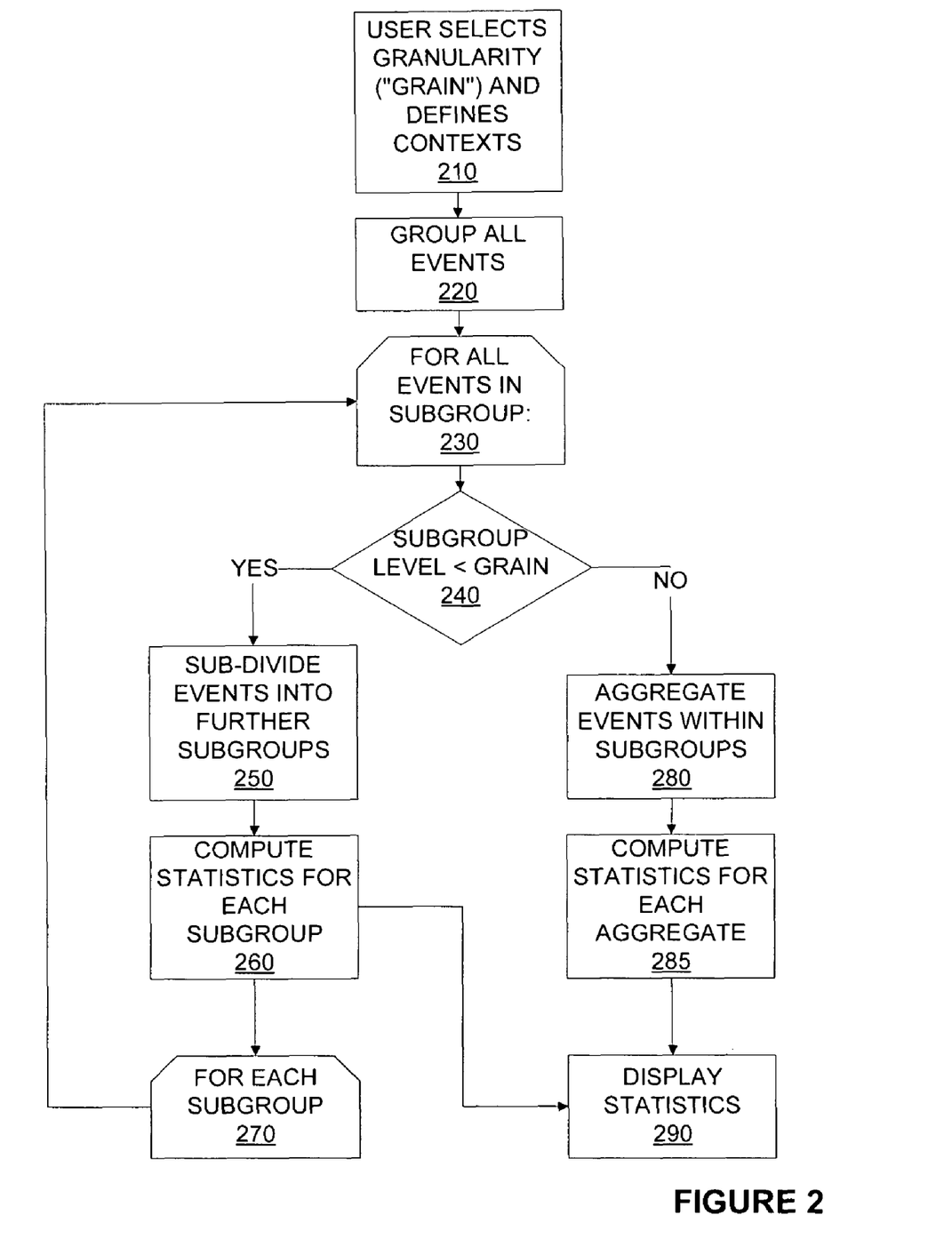
FIG. 2 is a flowchart outlining hierarchical event grouping, aggregation and statistics computation according to one or more embodiments of the invention.

FIG. 2 is a flowchart outlining hierarchical event grouping, aggregation and statistics computation according to one or more embodiments of the invention.

The invention in various embodiments presents two inter-related features, namely, hierarchical event grouping, aggregation and contextual event grouping. "Hierarchical event grouping" refers to a differentiation by structural or procedural level within the application's execution of events that take place. "Aggregation" refers to the collecting of identical events (events that are repeated) into one event via averaging and other such means. "Contextual event grouping" refers to the grouping/aggregating of similar events considered identical by virtue of their context. Each of these features may be pre-configured into the event logging or customized by the user at the time event logging is invoked or as in FIG. 2 may be configured or reconfigured when event statistics are viewed which may be after event logging has been turned off.

In FIG. 2, a user selects the granularity (noted by a variable "grain" in FIG. 2) referring to the lowest structural level of an application's code or event space that is to be aggregated (block 210). Further, the user can select/define contexts whose events are to be considered as identical for purpose of gathering the statistics. After an event log is completed for a given run-time instance (i.e. when events between the start and finish of an event logging session have been logged), then all of the events are grouped or arranged according to their functional level within the code of the application or according to user selected grouping (block 220). The grouping of events is enabled by the operational information provided by the application during event logging. The grouping of events in a hierarchical sense can take advantage of the "call stack", which is a operating system ordering of executable instructions resulting from the execution of application code. The call stack, advantageously, is by nature already organized in rough order of program flow. A developmental framework may also contain such clues as to the possible grouping of events. Such hints and call stacks allow the event logging center to determine a default grouping that may serve as a starting point or substitute for user customization.

The grouping of events, once completed, puts all events into a structural framework that starts from a coarse "granularity" to a finer and finer level of granularity and by nature, may be recursive/loop driven. Each group of events, at every level of granularity, will be referred to for the sake of simplicity as a "subgroup" to indicate that that it is potentially a logical subset of yet another group of events. Accordingly, once events are grouped from the event center a loop ensues (from block 230) that runs through each subgroup of event objects and recursively proceeds to a finer grain subgroup until the desired level of granularity is reached. As long as the subgroup level being processed is less than the variable "grain" (granularity level) (checked at block 240), a first set of processes shown in blocks 250 through 270 are performed.

Within each subgroup, the events therein are further divided into a finer and finer granular level of subgrouping (block 250). Within the currently processed subgroup (from which further subgroups were extracted in block 250), the statistics for that subgroup are computed (block 260). These statistics on the level of the subgroup are then displayed (block 290) (see description below). The display of statistics according to block 290 does not break out of the loop ensued at block 240, but is performed in parallel with it. Recursively, for each further divided subgroup (as divided in block 250) flow returns to block 230 which traverses through the events of the newly created subgroups. This process is recursive and blocks 250 through 270 are repeated and recursively so, until the (sub)group level is less than the granularity (represented by "grain") (checked at block 240). This indicates that the desired lowest level of grouping has been achieved and that the hierarchy of event grouping is completed. The event log would at this point have been traversed completely and event objects therein hierarchically organized (for example, see FIG. 4 and description below).

As such, all of the events that belong to a particular subgroup are aggregated and this aggregation is performed for each subgroup that has been defined by the recursion into the event log. Each "aggregate" is a collection of events that are identical and considered to be single event. Statistics for each aggregate may be computed (block 285) by computing the duration for each individual event and combining them through averaging and by maintaining any other desired statistics such as modal or deviation information. These statistics are then displayed to the user (block 290). The display of statistics (block 290) may be arranged in a hierarchical manner as well, showing the user the grouping of events and structural flow of the application. Advantageously, subgroup level statistics are computed during the recursive grouping process and thus do not have to be recomputed (block 260).

Figure 3:
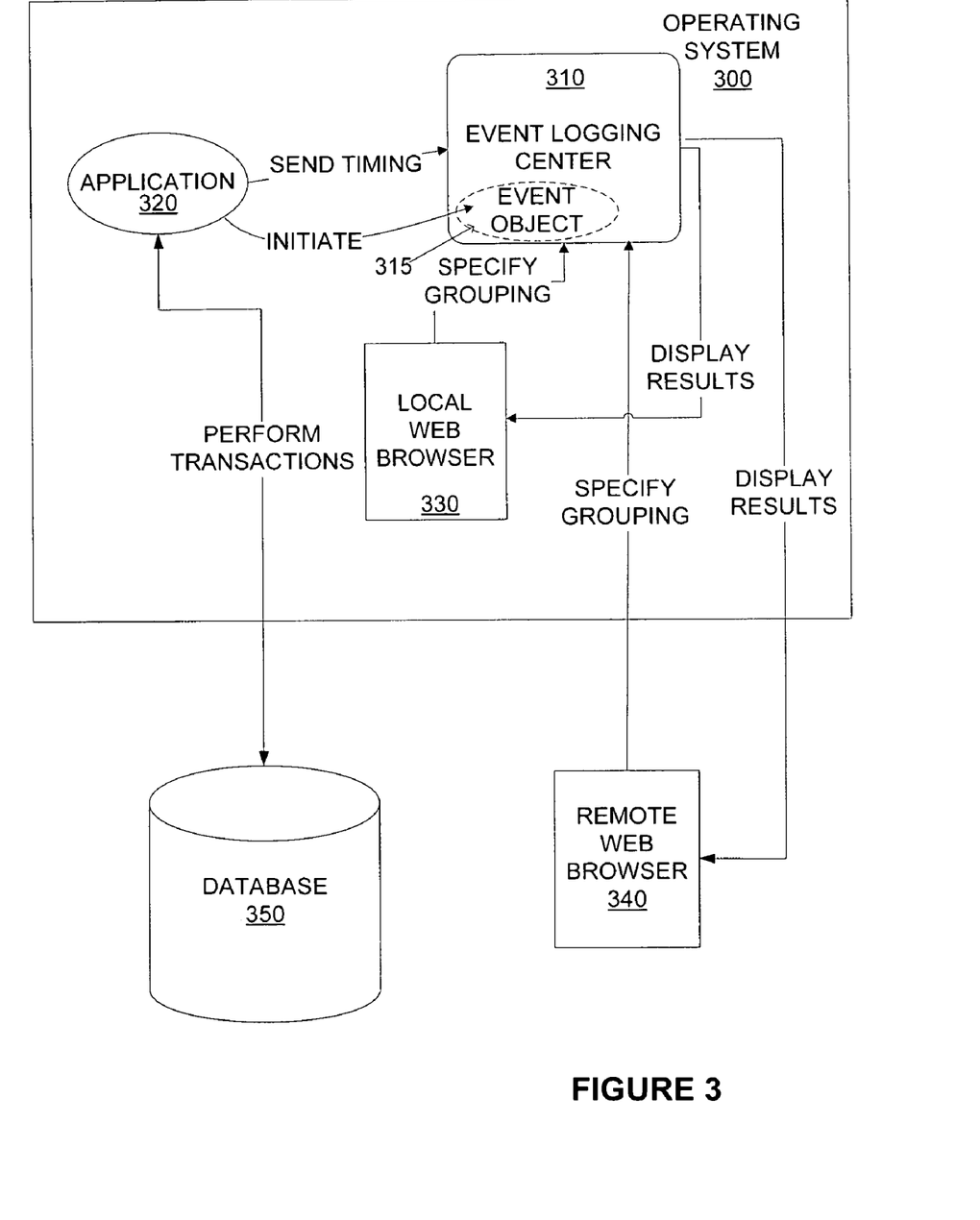
FIG. 3 is an operational system diagram of event logging and display according to one or more embodiments of the invention.

FIG. 3 is an operational system diagram of event logging and display according to one or more embodiments of the invention.

FIG. 3 shows an exemplary database application 320 where queries and updates (transactions) are performed by a user upon a database 350. Application 320 executes or is built on top of a operating system/framework space 300 and connects to the database 350 to perform transactions thereon. According to the invention, an event logging center 310 is provided as part of the operating system/framework 300. Event logging center 310 occupies a space in memory and executes under the operating system/framework 300 but is separate and independent of application 320. Other layer of abstraction. The event logging center 310, may be turned on and off by one of several means. The application 320 may have a provision for turning on event logging. If not, event logging may be turned on and off by a local web browser which also subsists in operating system/framework 300 or a remote web browser 340 which may not be part of the operating system/framework 300 at all, but merely sends and receives data with applications within it. There may be other means of turning on and off event logging such as starting event logging from within the auspices of the event logging center 310.

Once invoked, event logging proceeds for each event by the application 320 initiating a call to create an "event object" 315 in the event logging center 310 which is a reference to the event's start time, end time, and operational information (what the event does). For each event, a process similar to that shown with respect to FIG. 1 above is performed. The event object 315 subsists in the event logging center 310 which handles its memory allocation and storage. Once the event object 315 is created for a given event, the application 320 sends its start time to the event logging center 310. The event logging center 310 then records this start time into event object 315. When the event is complete, application 320 sends its ending time index to the event logging center 310. This process repeats over and over again for each event that is to be logged and continues until event logging is turned off. For each event subgroup, a Boolean flag is assigned and checked, which is independent of other flags for other events. Application 320 may inform the event logging center 310 of special events or subgroups in addition to default clues provided by call stacks and other mechanisms that are within operating system/framework 300.

When event logging is turned off, the event logging center 310 performs hierarchical event grouping, aggregation and contextual grouping, as described above with respect to FIG. 2. Any event objects that are incomplete (do not have ending time information) at the termination of event logging are destroyed and not counted. When statistics are computed at each aggregate or subgroup, they are displayed to the user. These results may be displayed on a graphical user interface such as that provided by local web browser 330 or remote web browser 340. The display of results may be in a drill-down or "threaded" fashion so that groupings and subgroupings can be easily visualized. As well, the display can show event details individually.

In one embodiment of the invention, both the local web browser 330 and remote web browser 340 have identical displays of event statistics and cannot configure their own displays based upon the raw statistics of the event logging. In yet another embodiment, each of the local web browser 330 and remote web browser 340 may specify the grouping of events that they desire communicating this to the event logging center 310. In this way, each user may alert the event logging center to their own preferences and see statistics in different contextual or hierarchically granular groupings on their respective displays. The configuration of event grouping and contexts may occur prior, during or after event logging. Control and display of results via a web browser in one embodiment is advantageous in that the event logging can be cross platform.

As an example, consider a database query for a customer list of customers who have outstanding orders. Several levels of subgrouping could be defined. For instance, the operation can be contextually considered from the start of the query to the display of the data from the database. Within the display, a list of customers involves individual fetches (one for each customer) form database 350. Each of these fetches may be considered an "event" whose timing is recorded in event objects such as event object 315. They are grouped under the coarser level subgroup of the total database fetch. The coarsest level under the query event subgroup consists of the subgroups: query processing, database fetch and then display of results. Each of these subgroups (such as the individual fetches within the database fetch main group) may have further subgroupings and so on.

Figure 4:
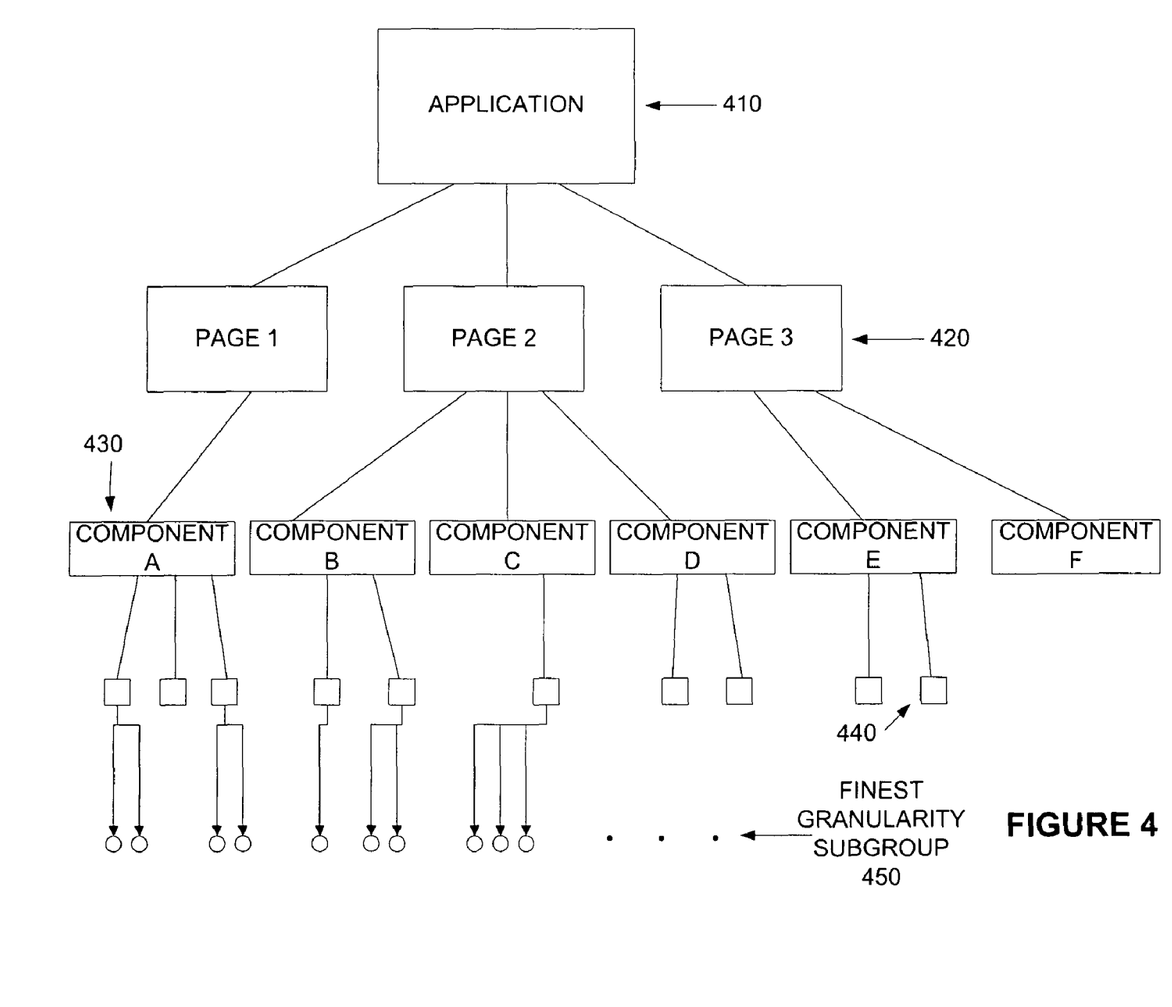
FIG. 4 is an organizational tree diagram of grouping, sub-grouping and granularity according to one or more embodiments of the invention.

FIG. 4 is an organizational tree diagram of subgrouping and granularity according to one or more embodiments of the invention.

The diagram of FIG. 4 represents an exemplary event hierarchy of an application. At the coarsest level 410 of granularity, is the application itself. The application as a whole is considered an event that has its own start and end. For example, if the application is a web browser, then the web browser, once started may generate a number of pages. The generation of each page is also an event and the group of all page generation events are thus considered a "subgroup" of the application event. This subgroup of page generation events are shown as subgroup level 420, which is finer in granularity than level 410 but coarser than its children. Note that there is no particular chronology of events represented in FIG. 4, but rather, a hierarchical organization.

Subgroup level 420 three page events, page 1, page 2 and page 3. These pages may be simultaneously generated (on simultaneous execution threads) or generated one after another, but in any case, are hierarchically related in the same manner as that shown. The next subgroup level 430 shows a number of component events-component A, component B, component C, component D, component E and component F-which belong variously as children of the page events belonging to subgroup level 420. The event logging mechanism does not necessarily follow assumptions about events since different instance of events within the same subgroup may have a different behavior. Page 1 of subgroup level 420 has only member belonging to subgroup level 430, namely, component A, while page 2 has three members in subgroup level 430-components B, C and D- and page 3 has two members in subgroup level 430-components E and F. Subgroup level 440 has children of components in level 430 which are of an even finer granularity. Component F of subgroup level 430 has no children below it, and thus no members belonging to subgroup level 440. The vent logging center is notified of this behavior during the logged application's runtime and can adjust its analysis of the log accordingly. This allows the event logging center to dynamically arrive at the hierarchical grouping of the events logged, rather than just guessing. The process of subgrouping extends until the finest granularity of subgrouping is reached. As described above, the user of the event logging may specify how granular the event statistics and log should be. In the example shown in FIG. 4 the user desired only five levels of subgrouping down to level 450. The finest granularity subgrouping level 450 is a subgroup of level 440 which is a subgroup of level 430 and so on.

As depicted in FIG. 4, some subgroup members have one child, multiple children or no children at all. The hierarchy is maintained regardless of whether only one child or multiple children persist for a given member of a subgroup. The event logging statistics can be arranged in a similar fashion to that shown in FIG. 4 but in a drill down fashion. For instance, clicking on the statistics for the page 2 event would yield statistics for component B, component C and component D and so on. While FIG. 4 primarily depicts a hierarchical grouping, it could also be viewed of as a contextual grouping. For instance, each of the pages, page 1, page 2 and page 3, could be different types of pages generated. One could be an information page, the other a form page for inputting and so on. Each of these page events could be considered to be in different contexts and thus, forgo/supplement the aggregation of statistics that might normally occur given merely the hierarchy. This added level of differentiation may be user or application specified and can provide a different statistical view of the events of the application.

Figure 5:
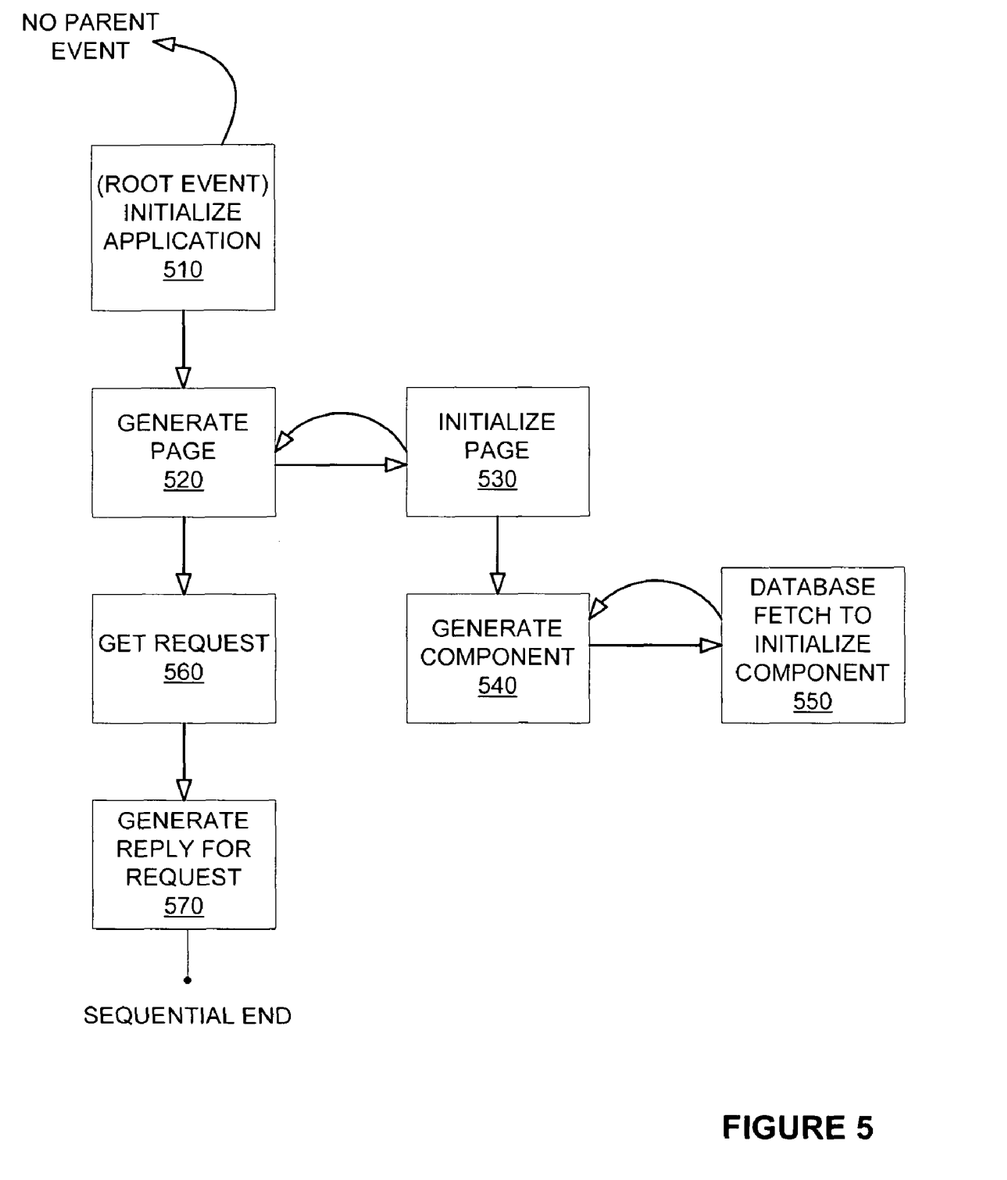
FIG. 5 illustrates an example of recursion as applied to event logging and analysis according to one or more embodiments of the invention.

FIG. 5 illustrates an example of recursion as applied to event logging and analysis according to one or more embodiments of the invention.

FIG. 5 shows an exemplary mapping of events in a database query application. A root event or subgroup 510 at the coarsest level is one that for example is the initialize or start-up of the application itself. Event 510 is a "root" event since it has no "parent" event (i.e. prior to event 510, other application events could not commence). The graph of FIG. 5 shows events occurring sequentially down the width of the page, and "child" or nested events to the right of their respective parent. After root event 510 ends, event generate page 520 commences.

Event generate page 520 cannot end until its subgroup of events also end. However, this is a necessary but not sufficient condition, since the end of the subgroups under event 520 does not necessarily mark the end of event 520. For instance, for event generate page 520 to end, first, initialize page event 530 must be started (indicated by the arrow from event 520 to event 530) and end (indicated by the curved arrow proceeding back from event 530 to event 520). As indicated by FIG. 5 event generate component 540 occurs chronologically following the end of event 530. Generate component 540 is not complete until it's nested or child event, the event "database fetch to initialize component" 550 is complete. Events 530 and 540 are at the same level of granularity. Event 550 is at a finest level of granularity since it has no children of its own. Generate component 540 is complete once event 550 returns its result, and this will trigger completion of the event subgroup of event 520 composed of event initialize page 530 and event generate component 540.

After generate page 520 is complete (and thus, all subgroup and nested events 530, 540 and 550), then event flow proceeds chronologically to "get request" 560. When get request 560 is complete another event "generate reply for request" 570 is performed.

Event logging for the events of FIG. 5 could be displayed and would be logged hierarchically in this manner:

```
start      510    (A)
perform    510
end        510    (B)
start      520    (C)
    start      530    (D)
    perform    530
    end        530    (E)
    start      540    (F)
        start      550    (G)
        perform    550
        end        550    (H)
    end        540    (I)
end        520    (J)
start      560    (K)
perform    560
end        560    (L)
start      570    (M)
perform    570
end        570    (N)
```

In the above exemplary event log for the events of FIG. 5 the numbers refer to the event numbers therein and the letters in parenthesis are time indexes for each start and end. The duration of event such as event 510 would be computed as "B-A" for example. The duration of event 520 could be computed as "J-C" rather than computing it as the sum of durations of all nested or recursed subgroups within it. Event 530 has a duration "E-D", event 540 has "F-I" and event 550 has "H-G". Likewise, event 560 has a duration "L-K" while event 570 has a duration of "N-M". In this regard, it should be noted that the computation of durations of events may be performed after event logging has been turned off. This allows the operating system/framework to have little, if any, additional load which may skew the results of the logging by introducing non-application timing delays (i.e. the time taken to compute durations, etc.). Likewise, statistics upon the durations such as averages, graphs, etc. may also be prepared after event logging has been turned off.

The events of FIG. 5 are shown as uniquely occurring and not repeating. However, any one or more of the events depicted may be repeated or may recur many times. For instance, many pages of database results may be generated which would imply some repetition of event 520 and its children. In this case, the aggregation of the present invention would take the durations for each occurrence of event 520 and consider them a single event (i.e. an aggregate). Assume that event 520 is repeated with a start time X and end time Y. Then, in the aggregate, event generate page has a total time taken of "J-C+Y-X" and has been performed twice. Knowing the count and total duration, an average can be computed and presented to the user. Since the log contains all of the raw data, a user may peer into the details of the two instances of event 520 to see if anything is anomalous.

The events of FIG. 5 may be better understood when translated from its abstract event description to a real-world scenario. Assume, for example, that event initialize application 510 refers the start-up of web browser application. After the application has "initialized" (i.e. been allocated memory to occupy, had its instructions loaded therein, etc.), the next event is generate page 520. Event generate page 520 must start with its own initialization. Thus, event initialize page 530 may equate to allocating memory and screen area to the window, but as shown in FIG. 5, must also include content that can fill the page. After the page is initialized (event 530), then the next sequentially occurring event is event generate component 540. Event 540 could be analogized to generating the drop down lists, toolbars, tables, menus etc. that often occupy a web page (i.e. its user interface elements). A necessary and sufficient condition for the completion of generate component 540 is event database fetch 550 which would correspond to filling the component with the desired data (e.g. list of categories for the toolbar).

Once the web page is generated (i.e. filled with data and user interface elements, but also, displayed to the user), then event generate page 520 has reached its end. After the end of event 520, event get request 560 commences. If the user is presented with input choices from the generated page, then get request 560 would correspond to the application getting a request (such as a search query) from the user based on what the generated page (event 520) has made available. After the request has been obtained (i.e. event 560 has ended) a reply to that request may be generated (event 570). Event logging takes account of the hierarchy of events as shown in FIG. 5, but also allows contextual grouping and statistics gathering. In this descriptive view of FIG. 5, assume that the events get request 560 and generate reply for request 570 were repeated many times for different types of data items. For instance, if one request dealt with the database look-up of a movie, while the other a music album, then these events could be separated by their context. Hence, rather than aggregating the two instances of event 570 into a single event, they could separated by their context of music album versus book. Aggregation could still occur but within context. For instance, if there were five replies for books and three replies for music albums, then the five book-related reply events could be aggregated into one while the three music-related reply events could be aggregated into another. From a hierarchical grouping standpoint, all eight (three music and five book) reply events are identical. But differentiating by context, they could be considered separately, as the invention's event logging provides for.

In this way, it may be possible to measure the speed/efficiency at which look-ups of books are performed in contrast with the look-up of music albums. This may have utility, for instance, if the size of the table and records associated with books versus music were vastly different, thus yielding different reply event timings. According to one embodiment of the invention, the non-contextual hierarchical count of all eight (book and music) events 570 could be maintained in addition to the contextual count of five events and three events as being separate.

Figure 6:
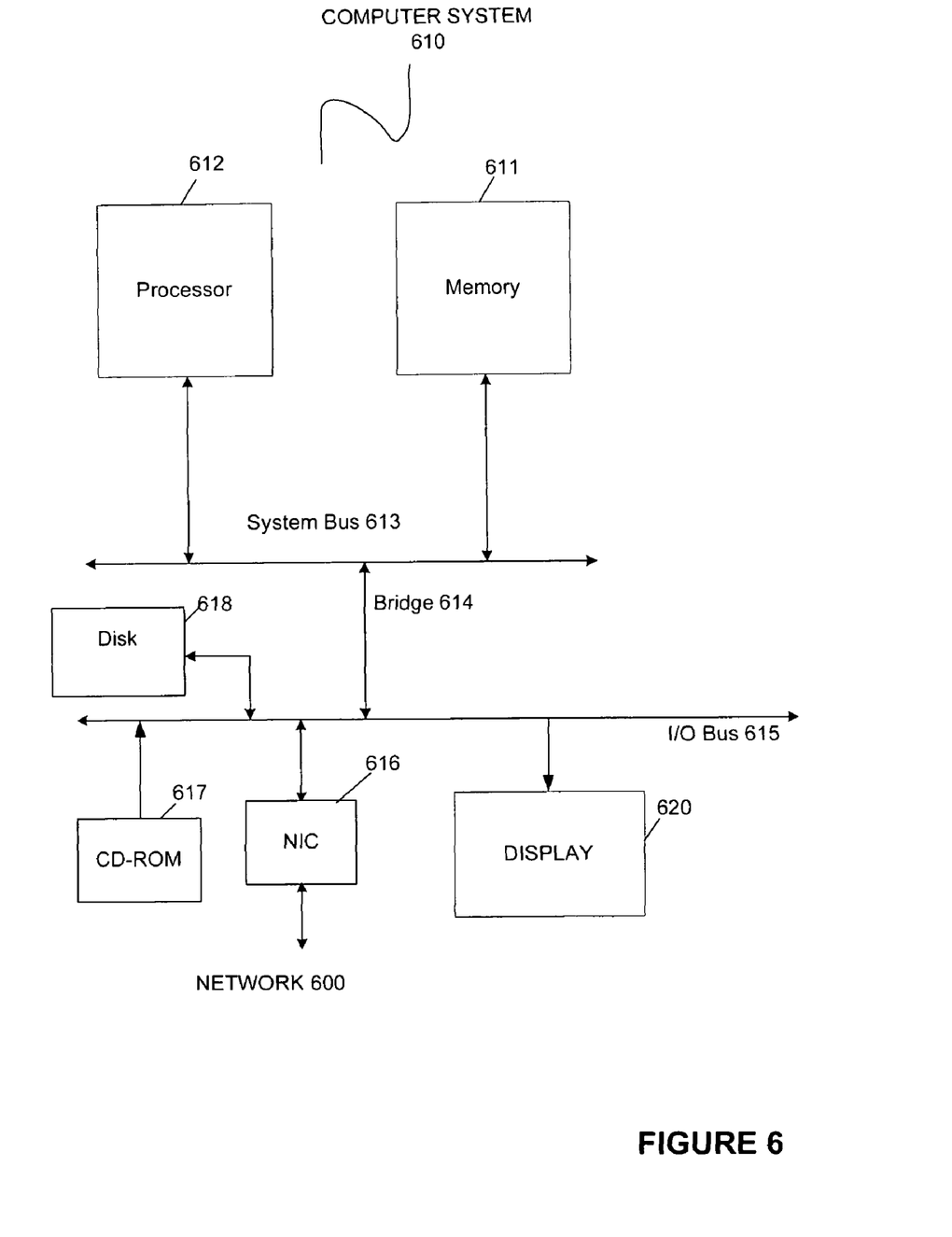
FIG. 6 is a computer system diagram that utilizes and implements one or more embodiments of the invention.

FIG. 6 is a computer system diagram that utilizes and implements one or more embodiments of the invention.

Illustrated is a computer system 610, which may be any general or special purpose computing or data processing machine such as a PC (personal computer). Computer system 610 is coupled to a network 600 which may connect to one or more networks, such as a Local Area Network or the Internet, enabling computer system 610 to transact information with other computer systems or information devices.

One of ordinary skill in the art may program computer system 610 to allow event logging that is capable of hierarchical and contextual event grouping as well as aggregation in a user customizable manner. As described above, event logging may be provided for in the operating system or framework that is common to applications executing within computer system 610.

Computer system 610 has a processor 612 and a memory 611, such as RAM, which is used to store/load instructions, addresses and result data as desired. Typically, when event logging is turned on, the instructions pertaining to implementing the logging (such as event object creation) are loaded into memory 611, executed by processor 612 and then given a memory space within 611 to execute. The implementation of the event logging center and associated functionality may derive from a low level source code such as assembler, a machine language or a higher level language or derivative thereof that has been embedded with the operating system/framework of the computer system 610. The instructions corresponding to the event logging center as well as the log of event objects and its associated information (e.g. start and end time indices), may be stored to any combination of a disk 618, such as a hard drive, or to memory 611.

Computer system 610 has a system bus 613 which facilitates information transfer to/from the processor 612 and memory 611 and a bridge 614 which couples to an I/O bus 615. I/O bus 615 connects various I/O devices such as a network interface card (NIC) 616, disk 618 and to the system memory 611 and processor 612. The NIC 616 allows the event logging results to be displayed to users connected to network 600. For instance, referring back to FIG. 3, the remote web browser 340 may access the event logging center and display the results therefrom via network 600.

Once event logging is completed and statistics thereafter computed, they can be displayed to a user through a web browser which may be displayed onto a display device (e.g. monitor) such as display 620. Through other input devices, such as a keyboard and/or mouse (not shown), the user can input their grouping preferences to the event logging center through the web browser running on the computer system 610 and displayed via display 620. In the case of a remote web browser, the NIC 616 is used to receive that remote user's grouping preferences and send event center results via network 600.

The invention claimed is:

1. A computer readable medium storing a computer program for execution by at least one processor, the computer program for logging events for a plurality of applications that operate on an operating system of a first computer, the computer program comprising sets of instructions for:

receiving a request from an application of said plurality of applications to create event objects associated with events of the application that have not been logged;

creating, in response to said request, the event objects in a first memory space that is separate from a second memory space in which said application operates;

receiving, from the application, temporal data and other data regarding the events;

storing the received data regarding the events in the event objects;

processing the stored data regarding the events in order to produce processed event data for display on a web browser of a second computer that is connected to the first computer through the Internet, wherein said processing comprises processing the stored data regarding a plurality of the events in order to group the stored data of the plurality of the events into a plurality of hierarchical sets of events, wherein each hierarchical set comprises a parent event and at least one child event; and defining, for a set of said hierarchical sets of events, a nested hierarchical display of event data for display on said web browser, said nested hierarchical display displaying the parent events at one aligned level in the hierarchy and displaying the child events at another aligned level in the hierarchy under the corresponding parent events, wherein said receiving the request, said creating, said receiving the data, said storing, and said processing are performed by an event logging mechanism that is part of said operating system and operates independently from said application on the first computer on which said application operates.

2. The computer readable medium of claim 1, wherein the computer program further comprises a set of instructions for checking whether event logging is turned on for each of the events.

3. The computer readable medium of claim 2, wherein a plurality of event objects are created for the plurality of events, wherein the sets of instructions for creating, receiving the data, and storing are performed for each of said plurality of events having event logging turned on.

4. The computer readable medium of claim 1, wherein the set of instructions for processing comprises a set of instructions for analyzing said event objects after event logging is turned off.

5. The computer readable medium of claim 4, wherein the set of instructions for processing further comprises sets of instructions for:

allowing user definition of hierarchical levels of granularity of events of event objects that are analyzed; and allowing user definition of contexts for differentiating repeated occurrences of events deemed identical by the defined contexts.

6. The computer readable medium of claim 5, wherein the set of instructions for processing further comprises sets of instructions for:

grouping events into hierarchical subgroups; and grouping events by context.

7. The computer readable medium of claim 6, wherein the set of instructions for processing further comprises sets of instructions for:

traversing through the hierarchical subgroups until a subgroup of finest granularity is traversed;

subdividing said events into further subgroups;

computing statistics for each subgroup while traversing; and displaying said statistics.

8. The computer readable medium of claim 7, wherein the set of instructions for processing further comprises sets of instructions for:

aggregating events deemed identical by virtue of the events' hierarchical position into an aggregate;

computing statistics for each aggregate; and displaying statistics for each said aggregate.

9. The computer readable medium of claim 7, wherein the set of instructions for processing further comprises sets of instructions for:

aggregating events deemed identical by virtue of the events' context into an aggregate;

computing statistics for each aggregate; and displaying said statistics for each said aggregate.

10. The computer readable medium of claim 1, wherein each of said events comprises an enable/disable state, wherein each event that is in the disable state precludes the event logging mechanism from creating an event object for the event, wherein the creating and storing are performed for each event that is in the enabled state.

11. A first computer comprising computer readable storage for storing:

an operating system comprising an event logger; and a plurality of applications operating on said operating system, said event logger operating independently of said applications, said event logger for receiving input through a web browser of a second computer to enable event logging, wherein said second computer is connected to said first computer through the Internet, wherein when said event logging is enabled, the event logger (i) identifies a set of events for a particular application that generates web pages, responds to selections received through said generated web pages, and operates on said operating system; (ii) generates an event log; and (iii) records event data regarding the identified set of events in the event log, said event log generated and said event data recorded in the event log without referencing any event logs of said application;

wherein the set of event data relates to at least one of a request for a web page, generation of the requested web page, and a request received through a selection of an item of the generated web page, wherein said event logger performs the identifying, generating, and recording on said first computer on which said particular application operates, wherein each event in the set of events is enabled or disabled separately, and wherein when said event logging is disabled through the web browser of said second computer, said event logger foregoes the identifying, generating, and recording on said first computer on which said application operates.

12. The computer of claim 11, wherein said event logger records the event data by recording start time, end time, and other event data into an event object for each event in the set of events.

13. The computer of claim 11, wherein said operating system comprises a foundational layer, wherein said event logger operates on said foundational layer.

14. The computer of claim 13, wherein said foundational layer is a programmable framework.

15. The computer of claim 11, wherein when said event logging is enabled, said event logger further generates a plurality of event objects and analyzes said event objects in order to generate an analyzed result for display on said web browser.

16. The computer of claim 15, wherein said event logger is configured to analyze said event objects based upon hierarchical and contextual groupings.

17. The computer of claim 16, wherein said event logger is configured to aggregate said event objects deemed identical based upon at least one of said hierarchical and contextual groupings.

18. A computer comprising computer readable storage for storing:

an operating system comprising an event logger; and a plurality of applications for operating on said operating system, the event logger for (i) receiving a request to create an event log, (ii) recording event data for each of a plurality of events of the plurality of applications in a first memory space that is uniquely allocated for the event logger and is separate from a second memory space allocated for the plurality of applications, (iii) grouping a plurality of said event data into a plurality of hierarchical sets of events, wherein each hierarchical set comprises a parent event and at least one child event, (iv) analyzing said event log according to hierarchical groupings, and (v) for a plurality of said hierarchical sets of events, defining a nested hierarchical display of event data that displays the parent events at one aligned level in a hierarchy and displays the child events at another aligned level in the hierarchy under the corresponding parent events, wherein said event logger is turned on, turned off, and configured using a web browser.

19. The computer of claim 18, wherein said operating system further comprises a framework, said framework comprising said event logger.

20. The computer of claim 18 further comprising a first area of memory allocated to a particular application of said applications, a second area of memory allocated to the event logger, wherein said first area of memory allocated to the particular application is separate from the second area allocated to the event logger.

21. The computer of claim 18, wherein said event logger is further for allowing a user to enable and disable event logging for each event in the plurality of events, wherein said recording event data is performed for each event that has event logging enabled.

22. The computer of claim 18, wherein the operating system comprises a framework upon which applications are executed.

23. An event logging method comprising:

for each of a plurality of events that needs to be logged within a plurality of applications operating on an operating system of a computer:

receiving a request to create an event log;

recording event data for each of a plurality of application events in a first memory space that is uniquely allocated for event logging, said first memory space separate from a second memory space allocated for the plurality of applications;

for each application in said plurality of applications, grouping a plurality of said event data into a plurality of hierarchical sets of events, wherein each hierarchical set comprises a parent event and at least one child event; and for a plurality of said hierarchical sets of events, defining a nested hierarchical display of event data that displays the parent events at one aligned level in a hierarchy and displays the child events at another aligned level in the hierarchy under the corresponding parent events, wherein said recording, grouping, and defining are performed by an event logging mechanism that is part of the operating system of said computer and that runs independently from said applications on said computer, wherein each of a plurality of application events comprises an enable/disable state, wherein the disable state of a particular event precludes the event logging mechanism from logging said particular event.

24. The method of claim 23, wherein the operating system comprises a framework, said framework comprising the event logging mechanism.

25. The method of claim 23 further comprising checking, for each event identified for a particular application in the plurality of applications, whether event logging is enabled.

26. The method of claim 23, wherein said nested hierarchical display is for display in a web browser.

27. The method of claim 26, wherein said computer is a first computer, wherein said web browser executes on a second computer that is connected to said first computer through the Internet.

28. The method of claim 23, wherein the first memory space is a memory space that is allocated solely for event logging.

29. The method of claim 23, wherein the events that are logged by the event logging mechanism have not been previously logged by any other application.

30. The method of claim 23, wherein information placed in the event data is first logged by the event logging mechanism.

31. A method of logging events for an application, said method comprising:

receiving a request from the application to create an event log;

receiving a set of events generated by said application;

creating a corresponding set of event data in a first memory space that is separate from a second memory space in which the application executes;

analyzing the set of event data by determining a procedural level at which each event is executed in the application;

hierarchically grouping said set of event data into a plurality of groups based on said analysis of the set of event data, wherein each event executed at a same procedural level in the application is grouped in a same group; and defining a hierarchical display of event data comprising a nested hierarchical presentation of data for each of said events based on said grouping, said hierarchical display presented in a web browser, wherein said receiving a request, receiving the set of events, creating, analyzing, grouping, and defining are performed by an event logging mechanism that is part of an operating system that runs independently from said application on a single computer on which said application executes.

32. The method of claim 31, wherein said single computer is a first computer, wherein said event logging mechanism is for receiving input through a web browser of a second computer to enable event logging, wherein said second computer is connected to said first computer through the Internet.

33. The method of claim 32, wherein when said event logging is disabled through the web browser of said second computer, said event logging mechanism foregoes the creating, analyzing, grouping, and defining on said first computer on which said application operates.

34. The method of claim 32, wherein said event logging mechanism is turned on, turned off, and configured using the web browser of the second computer.

35. The method of claim 31, wherein each of a plurality of events comprises an enable/disable state, wherein the disable state of a particular event precludes the event logging mechanism from logging said particular event.

36. The method of claim 31, wherein said web browser is a web browser executing on said single computer.

37. The method of claim 31, wherein said single computer is a first computer, wherein said web browser executes on a second computer that is connected to said first computer through the Internet.

38. A computer comprising computer readable storage for storing:

an operating system comprising an event logger; and a plurality of applications operating on said operating system, wherein at least one particular application is for generating web pages and responding to web page selections received through said generated web pages, wherein the event logger is for (i) receiving a request from the particular application to create an event log, (ii) functioning interoperably with but separately from said applications, (iii) identifying a plurality of event data for a plurality of application events of the particular application, said application events comprising a request for a web page, generation of the web page, and a request received through a selection of an item of the generated web page, (iv) storing the event data in the event log, (v) analyzing of said event log according to hierarchical grouping, wherein each of said plurality of application events comprises an enable/disable state, wherein the disable state precludes the event logger from creating an event log, wherein the identifying and storing are performed for each event that has an enabled state.

39. The computer of claim 38, wherein said storing said event data comprises storing, for each event that is logged, a start time, end time, and information regarding the event.

40. A method of logging events for a plurality of applications that operate on an operating system of a first computer, the method comprising:

receiving a request from a particular application of said applications to create event objects associated with events of the particular application that have not been logged;

in response to said request, creating the event objects in a first memory space that is separate from a second memory space in which said particular application operates;

from the particular application, receiving temporal data and other data regarding the events;

storing the received data regarding the events in the event objects;

processing the stored data regarding the events in order to produce processed event data for display on a web browser of a second computer that is connected to the first computer through the Internet, wherein said processing comprises processing the stored data regarding a plurality of the events in order to group the stored data of the plurality of the events into a plurality of hierarchical sets of events, wherein each hierarchical set comprises a parent event and at least one child event; and for a set of said hierarchical sets of events, defining a nested hierarchical display of event data for display on said web browser, said nested hierarchical display displaying the parent events at one aligned level in a hierarchy and displaying the child events at another aligned level in the hierarchy under the corresponding parent events, wherein said receiving the request, said creating, said receiving the data, said storing, and said processing are performed by an event logging mechanism that is part of said operating system and operates independently from said application on said first computer on which said application operates.

41. The method of claim 40, wherein the second computer and the first computer are the same computer.

42. The method of claim 40 further comprising determining whether event logging has been turned on for each of the events.

43. The method of claim 40, wherein said creating, receiving the data, and storing are performed for each event having event logging turned on.

44. The method of claim 40, wherein the processing further comprises:

aggregating events deemed identical by virtue of the events' context into an aggregate;

computing statistics for each of said aggregates; and displaying said statistics for each of said aggregate.

* * * * *

UNITED STATES PATENT AND TRADEMARK OFFICE
CERTIFICATE OF CORRECTION

| | | |
|---|---|---|
| PATENT NO. | : 7,774,790 B1 | Page 1 of 1 |
| APPLICATION NO. | : 09/618367 | |
| DATED | : August 10, 2010 | |
| INVENTOR(S) | : Stan Jirman et al. | |

It is certified that error appears in the above-identified patent and that said Letters Patent is hereby corrected as shown below:

On the first page, in field (75), in column 1, in "Inventors", line 2, delete "Sunnyale," and insert -- Sunnyvale, --, therefor.

In column 16, line 27, in claim 43, delete "40," and insert -- 42, --, therefor.

Signed and Sealed this
Twenty-second Day of November, 2011

David J. Kappos
*Director of the United States Patent and Trademark Office*